United States Patent
Valente (10) Patent No.: US 9,591,284 B2
(45) Date of Patent: Mar. 7, 2017

(54) VISUALLY-ASSISTED STEREO ACQUISITION FROM A SINGLE CAMERA

(71) Applicant: ST-Ericsson SA, Plan-les-Ouates (CH)

(72) Inventor: Stéphane Valente, Paris (FR)

(73) Assignee: OPTIS CIRCUIT TECHNOLOGY, LLC, Plano, TX (US)

(*) Notice: Subject to any disclaimer, the term of this patent is extended or adjusted under 35 U.S.C. 154(b) by 271 days.

(21) Appl. No.: 14/138,800

(22) Filed: Dec. 23, 2013

(65) Prior Publication Data
US 2014/0184747 A1    Jul. 3, 2014

(30) Foreign Application Priority Data

Dec. 27, 2012 (EP) ..................... 12306689
Jul. 18, 2013 (EP) ..................... 13306031

(51) Int. Cl.
*H04N 13/02* (2006.01)

(52) U.S. Cl.
CPC ..... *H04N 13/0221* (2013.01); *H04N 13/0296* (2013.01)

(58) Field of Classification Search
CPC .................................. H04N 13/0221
USPC ........................................ 348/46
See application file for complete search history.

(56) References Cited

U.S. PATENT DOCUMENTS

| | | | |
|---|---|---|---|
| 2007/0165129 A1 | 7/2007 | Hill et al. | |
| 2011/0025829 A1* | 2/2011 | McNamer | H04N 13/021 348/50 |
| 2011/0255775 A1 | 10/2011 | McNamer et al. | |
| 2012/0120068 A1 | 5/2012 | Chiaki et al. | |
| 2012/0120202 A1* | 5/2012 | Yoon | H04N 13/0239 348/49 |
| 2012/0200670 A1* | 8/2012 | Pockett | H04N 13/0203 348/46 |
| 2012/0242794 A1 | 9/2012 | Park et al. | |
| 2013/0201301 A1* | 8/2013 | Huang | H04N 13/0221 348/50 |

OTHER PUBLICATIONS

David G. Lowe, "Distinctive Image Features from Scale-Invariant Keypoints", 2004. International Journal of Computer Vision 60(2). pp. 91-110.*

(Continued)

*Primary Examiner* — Gims Philippe
*Assistant Examiner* — Amir Shahnami
(74) *Attorney, Agent, or Firm* — The Danamraj Law Group, P.C.; Thomas L. Crisman; Kenneth A. McClure (57) ABSTRACT

A method of indicating a suitable pose for a camera for obtaining a stereoscopic image, with the camera comprising an imaging sensor. The method comprises obtaining and storing a first image of a scene using the imaging sensor when the camera is in a first pose; moving the camera to a second pose; and obtaining a second image of the scene when the camera is in the second pose. One or more disparity vectors are determined, each disparity vector being determined between a feature identified within the first image and a corresponding feature identified in the second image. On the basis of the one or more disparity vectors, a determination is made of whether the second image of the scene is suitable for use, together with the first image, as a stereoscopic image pair.

23 Claims, 9 Drawing Sheets

(56) References Cited

OTHER PUBLICATIONS

B. Triggs; P. McLauchlan and R. Hartley and A. Fitzgibbon, "Bundle Adjustment—A Modern Synthesis". 2000. https://lear.inrialpes.fr/pubs/2000/TMHF00/Triggs-va99.pdf. p. 5.*
www.wikipedia.org/wiki/Bundle Adjustment.*
Herbert Bay et al. "SURF: Speeded Up Robust Features." Computer Vision and Image Understanding (CVIU), Jun. 2008, pp. 346-359, vol. 110, No. 3, Elsevier Science Inc., New York, NY.

* cited by examiner

VISUALLY-ASSISTED STEREO ACQUISITION FROM A SINGLE CAMERA

RELATED APPLICATIONS

This application claims the benefit of European Application No. 12306689.6, filed 27 Dec. 2012, and European Application No. 13306031.9, filed 18 Jul. 2013, the disclosures of each of which are incorporated herein by reference in their entirety. These priorities are claimed under the Paris Convention.

TECHNICAL FIELD

The present disclosure generally relates to picture capturing devices, and more particularly to a method and an apparatus to mimic the behavior of a stereoscopic camera using only a single image capture device.

It finds applications, in particular, in algorithms used in Integrated Circuits (IC) for consumer electronic devices having a capacity of handling, i.e., acquiring, processing and/or playing still or moving pictures. Such products include wireless products with a digital camera, digital camcorders, etc. In particular, such products include mobile terminal devices, such as mobile phones (cell phones), smart phones, wireless tablets, and so forth.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Consumer electronic devices capable of generating or displaying three-dimensional images are becoming widespread. Examples of such devices comprise, stereoscopic 3D television sets, mobile phones with stereoscopic displays, such as the HTC EVO 3D and stereoscopic digital still cameras, such as the FUJI™ FinePix Real 3D W1 3D Digital Camera.

A stereoscopic picture of a scene consists of two images, one for the left eye, and the other for the right eye, trying to mimic the effects of human binocular vision. If the two pictures are taken from slightly different points of view, then the resulting images will in turn be slightly different, and objects in both images will appear in different location in the two images. The difference between the object locations in the two images are known as disparities.

When viewing one image with one eye, and the second image with the other eye, the human brain uses these disparities, to interpret the viewed picture pair as representing a three-dimensional (3D) scene.

To offer a greater viewing comfort, usually only a horizontal disparity between objects is desired, since any vertical disparity will result in a scene that is uncomfortable to view for human subjects. Thus, ideally, stereoscopic pictures exhibit pure horizontal disparities between objects, and no vertical disparity. In such an ideal stereoscopic picture, pixels corresponding to the same physical object are therefore located on the same horizontal line in each image in the pair.

Figure 1:
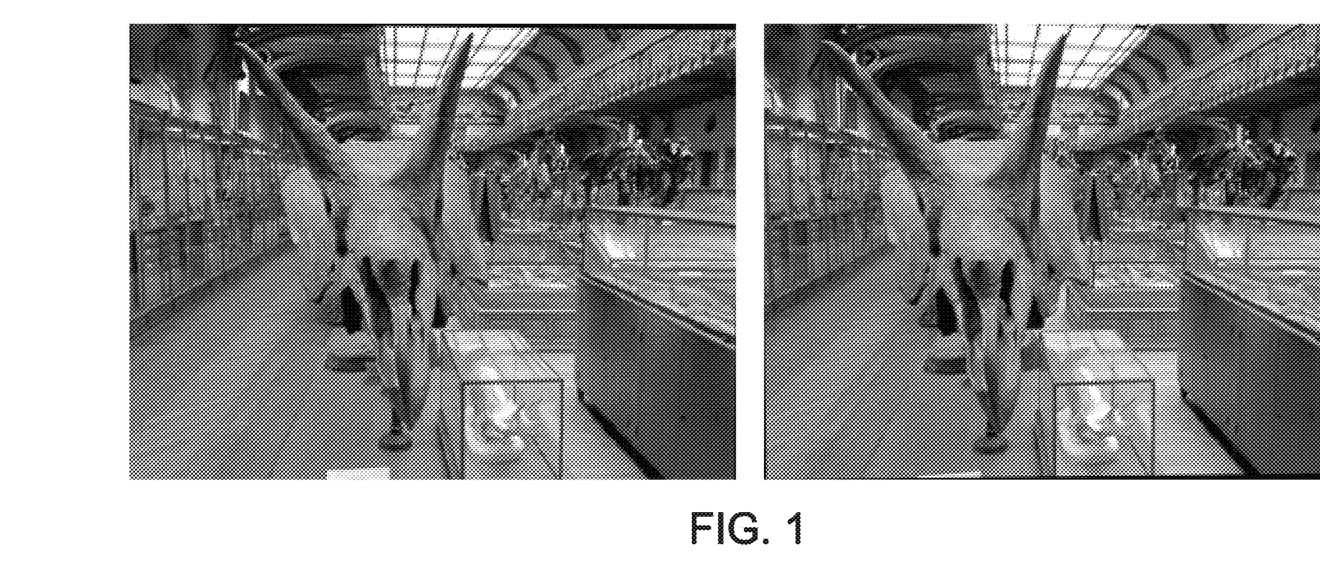
FIG. 1 shows stereoscopic pictures: left and right images.

To acquire such pictures typically, stereoscopic cameras comprise a pair of cameras with a fixed baseline. In other words, the distance between the camera apertures is a fixed horizontal distance, corresponding to the distance between human eyes. This distance is approximately 6 centimeters, and FIG. 1 illustrates a pair of stereoscopic images acquired with such a fixed baseline.

Stereoscopic cameras can be mechanically aligned and mounted on a rigid support to help ensure that a purely horizontal disparity is achieved. However, such mechanical alignments are often not sufficiently precise to avoid some degree of vertical disparity also being present. To compensate for this effect, some cameras implement rectification algorithms, to further eliminate vertical disparities by warping the pictures and/or aligning the images. For all these reasons, stereoscopic cameras are typically more expensive to manufacture than single-view cameras.

An alternative method of acquiring a stereoscopic pair of pictures is to use a single camera, and let the user; acquire a first image that will become, for example, the left image; displace the camera to the right; and then acquire a second image, with the camera pointing in the same direction as for the first image. This second image will become the right image. This alternative method of acquiring a stereoscopic pair of pictures is often referred to as the "click-click" solution. Since a camera with only a single image capture device is required, the "click-click" solution is generally less expensive than solutions using a true stereoscopic camera. In addition, the "click-click" solution can also be implemented on the majority of today's consumer electronic devices such as mobile phones.

When displacing the camera, there are six available degrees of freedom. The camera can be rotated about three perpendicular axes or translated along three perpendicular directions. When displacing the camera, any combination of rotations and/or translations can be made.

Typically, for obtaining stereoscopic images, the camera should be moved in a manner that translates the camera in a direction that is perpendicular to the viewing direction of the camera (typically the horizontal direction), but that does not translate the camera in any other direction or rotate the camera orientation.

Here, we define the horizontal direction as being a direction that is parallel to a direction in the sensor of the camera, typically an edge of the sensor, rather than the actual horizontal direction as defined by gravity.

A disadvantage of the "click-click" method is that, typically, a human user holding and displacing the camera between the two image acquisitions cannot attain the desired purely horizontal disparity. As a result, the two pictures acquired by the "click-click" method may not be properly aligned in the horizontal direction and/or may not have been taken with the camera oriented in the same direction.

For example, if the camera undergoes rotation about the optical axis (roll) between the two pictures, then a two-dimensional deformation will occur between the two images. If the camera undergoes rotation about one or more of the other two rotation axes (pitch and yaw), then a three-dimensional deformation will occur between the two images due to distortions arising from a change in perspective of the scene between the two images.

The presence of one or more undesired rotation or translation between the two images will result in undesired disparities, and this will reduce the stereoscopic quality of the image pair.

As noted above, there can be errors in both the position and orientation of the camera for taking the second image. Throughout this document, the term "pose" is used to define the combination of position and orientation of a camera. Thus, "pose" defines both the spatial position of the camera with respect to an arbitrary coordinate system, and also the orientation of the viewing direction of the camera with respect to that coordinate system.

Figure 2:
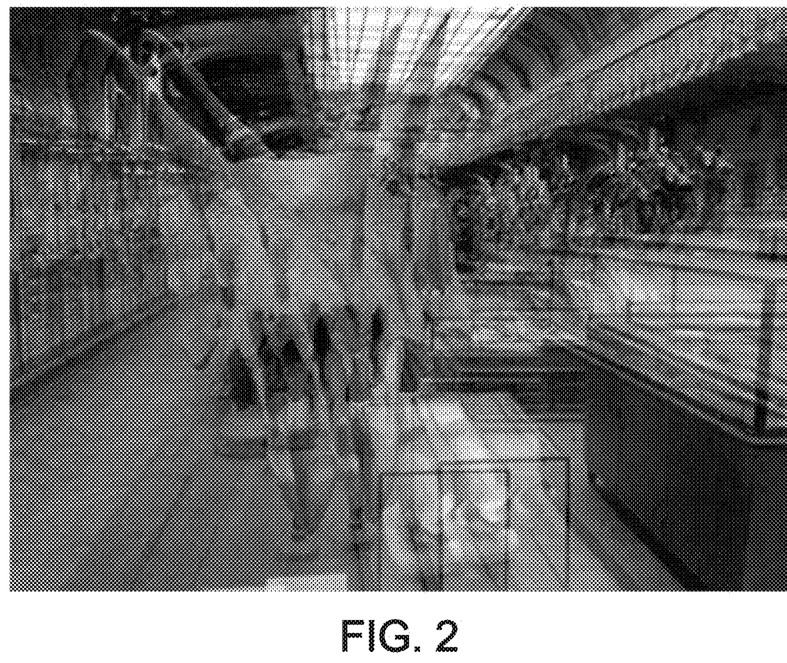
FIG. 2 shows superimposed left and right images, in a single picture.

One solution to this problem is to provide the user with feedback during the image capture process to help them align the camera with the desired pose. This can be achieved by superimposing the static left image with a live right image in the viewfinder of the camera. This allows the user to adjust the camera to acquire a right image that is correctly aligned with the previously acquired left image. Such a superimposed image is illustrated in FIG. 2. This method can allow an improvement to the quality of the stereoscopic pairs of images acquired, but the resulting image can be confusing to the user and difficult to understand.

Document US 2007/0165129 A1 discloses a method for selecting a stereoscopic pair of images, for example as they are captured by a camera or from an existing collection of captured images. A first image is selected and a cursor overlaid on the first image is aligned with an image feature. The cursor is then shifted by a predetermined amount and a second image is selected such that the cursor is overlaid on the second image and is substantially aligned with the feature.

It is an object of the embodiments described herein to overcome or mitigate at least some of the above-described problems.

SUMMARY

In a first embodiment, there is provided a method of determining a suitable pose for a camera for obtaining a stereoscopic image, the camera comprising an imaging sensor, the method comprising: obtaining and storing a first image of a scene using the imaging sensor when the camera is in a first pose; moving the camera to a second pose; obtaining a second image of the scene when the camera is in the second pose; determining one or more disparity vectors, the or each disparity vector being determined between a feature identified within the first image and a corresponding feature identified in the second image; and determining, on the basis of the one or more disparity vectors whether the second image of the scene is suitable for use, together with the first image, as a stereoscopic image pair.

In some embodiments, indicating information is provided to a user to indicate whether the second pose is suitable.

Thus, advantageously, the method can provide a user with feedback enabling them to obtain a well-aligned stereoscopic image pair. The method allows a user to efficiently take 3D stereoscopic pictures with, for example, a mobile phone having only a single camera, by guiding the user into correctly placing the camera for the second image after the first one is taken. Having interactive indications is helpful to the user, and gives immediate feedback to achieve a proper stereo placement that may not be possible, or may be more difficult to achieve and/or give stereo pictures of less quality without these indications.

In some embodiments, the indicating information comprises an indication of the direction of the one or more disparity vectors displayed on a display of the camera. Thus, advantageously, the user can see immediately how to adjust the position and/or orientation of the camera to achieve a desired pose.

In some embodiments, the display of the one or more disparity vectors is altered when it is determined that the disparity vector is parallel with the horizontal direction. Thus, the user can easily see when the desired (horizontal) state of the one or more disparity vectors has been achieved.

In some embodiments, the determination of whether the second pose is suitable is made on the basis of the motion of the camera between the first pose and the second pose, and the indicating information comprises instructions informing a user of the manner in which to move the camera to achieve the suitable pose. Thus the user can be given direct instructions as to how to move the camera.

In some embodiments information of the motion of the camera is derived from a bundle analysis performed on the first image and the second image. Thus, such an analysis can provide a measure of the motion of the camera directly from two or more images of the scene.

In some embodiments the indicating information includes an indication that the second pose is suitable when it is determined that the second pose is suitable within a predetermined tolerance. Thus, the user need not make very fine adjustments to the second pose which would be difficult for the user to achieve.

In some embodiments a second image is stored automatically when it is determined that the second pose is suitable. Thus, the user will not need to press a shutter button in addition to manipulating the pose of the camera. Further, any delay or motion resulting from the user needing to press the shutter button can be avoided to thereby achieve a better result.

In some embodiments repeated determinations of whether the second pose is suitable are made as the camera is moved by a user. Thus, the user can have more than one attempt at obtaining the correct pose for the camera.

In some embodiments, the indicating information further comprises an indication of the length of the disparity vector. Thus, the user can be informed of whether a good "depth" of the stereoscopic image resulting from the combination of the first and second images is achieved.

In some embodiments, a plurality of disparity vectors are determined, and the indicating information further comprises an indication of the relative angle between each of the plurality of disparity vectors. Thus, the user can be informed of whether the second pose is suitable in each of the three rotation axes.

A second aspect provides a camera for obtaining a stereoscopic image, the camera comprising an imaging sensor, and one or more processing circuits configured to for obtain and store a first image of a scene using the imaging sensor when the camera is in a first pose; obtain a second image of the scene using the imaging sensor when the camera is in a second pose; determine one or more disparity vectors, each disparity vector being determined between a feature identified within the first image and a corresponding feature identified in the second image; and determine, on the basis of the one or more disparity vectors whether the second image of the scene is suitable for use, together with the first image, as a stereoscopic image pair.

A third aspect provides a computer program product comprising one or more stored sequences of instructions that are accessible to a processor and which, when executed by the processor, cause the processor to carry out the steps of the method of the first aspect. The computer program product is stored in a computer readable medium.

A fourth aspect provides an apparatus having means for implementing the steps of the method of the first aspect. A fifth aspect provides a user device, for example a wireless device comprising an apparatus according to the third aspect. Examples of such wireless devices include those listed in the introduction of the present description.

BRIEF DESCRIPTION OF THE DRAWINGS

The present disclosure is illustrated by way of example, and not by way of limitation, in the figures of the accompanying drawings, in which like reference numerals refer to similar elements and in which.

DETAILED DESCRIPTION

Figure 11:
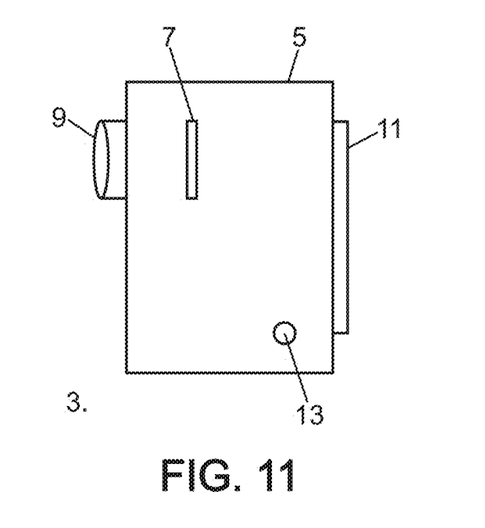
FIG. 11 illustrates a schematic diagram of a camera suitable for use in the described embodiments.

FIG. 11 illustrates a schematic diagram of an example of a camera 3 suitable for use with the described embodiments. The camera 3 comprises a body 5 and an imaging sensor 7, such as a CCD or CMOS sensor for detecting incident illumination located in the body 5. A lens 9 is positioned on the body 5 and in front of the sensor 7 so as to produce an image of a scene on the sensor 7. A viewfinder 11 is located on the body 5, and is configured to provide a representation of the image generated at the sensor 7. A shutter button 13 is provided to activate the camera 3 to acquire and store an image from the sensor 7. As illustrated in FIG. 11, the shutter button 13 is a mechanical button. However, the skilled person will recognize that if the viewfinder 11 comprises a touch screen, then the shutter button 13 can be implemented in the form of a virtual button displayed on the touch screen.

The general process for obtaining stereoscopic images according to the described embodiments is firstly to acquire a first image of the desired scene, for example the left image. Subsequently, the camera 3 is translated in a horizontal direction that is perpendicular to a viewing direction, and finally the second image, in this example the right image, is acquired. The skilled person will recognize that it is not important to the function of any of the described embodiments whether the right image or the left image is obtained first, so long as the user is aware of which of the two images the camera is programmed to take first. The embodiments will all function equally whichever image is the first to be obtained. However, for the purposes of the described examples, it will be assumed that the left image is obtained first, and the right image obtained afterwards.

Figure 3:
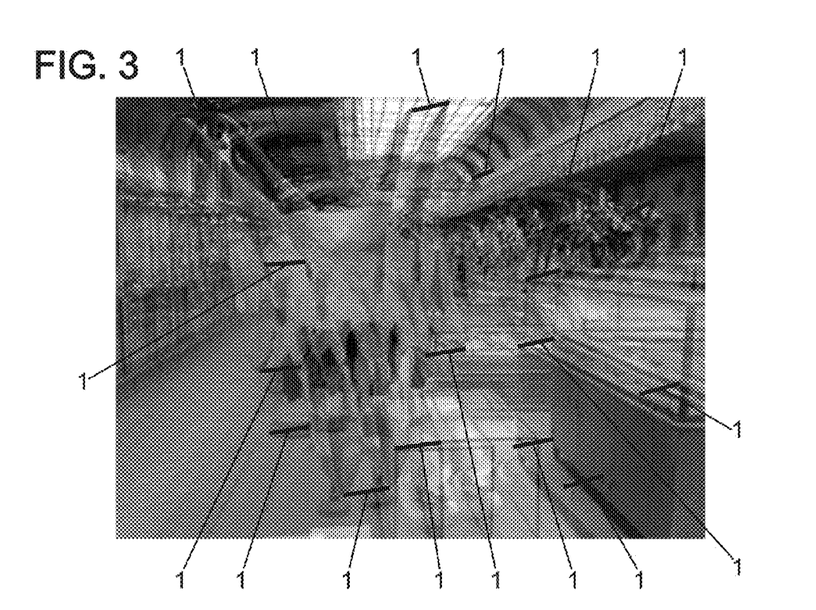
FIG. 3 shows superimposed left and right images, with disparity vectors indicated.

FIG. 3 illustrates an image which comprises a superimposed, static, left image with a live right image in the viewfinder of a camera 3. In addition, the discrepancy between the left and right images is indicated in the form of disparity vectors 1 displayed on the images. Each disparity vector 1 indicates the difference in location of a particular feature from one image to the other, either from the right image to the left image or vice versa. Thus, each disparity vector 1 describes the straight line that connects a given point on one image with the corresponding point on the other image.

The term feature is used here to define an object that can be identified in both images. Processes for the identification of features within digital images are well known in the art, and the particular process used is not important. Features can, for example, be any pattern of pixels that are reproduced in both images. The reproduction can either be identical, or above some measure of similarity.

The disparity vectors 1 can be used by a user as an aid to aligning the camera 3 into a suitable position and orientation for obtaining the right image. The skilled person will recognize that the presence of both the left (static) and right (live) images are not necessary in the presence of the disparity vectors 1. Accordingly, one or both of the images need not be displayed during the process of aligning the camera 3 for the second image.

Figure 4:
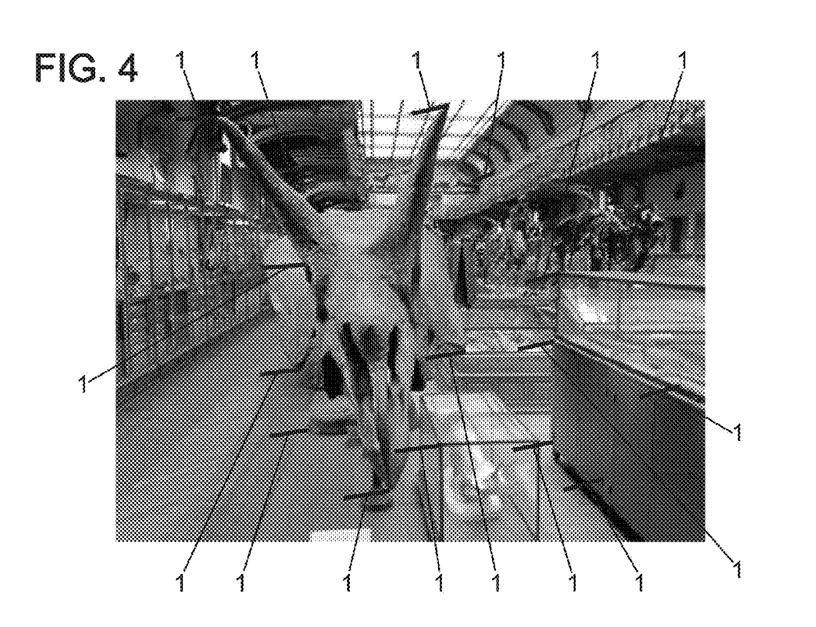
FIG. 4 shows a right image, with non-horizontal disparity vectors referencing the left image.

FIG. 4 illustrates such a situation according to a first embodiment, in which only the right (live) image is shown together with some disparity vectors 1. As illustrated in FIG. 4, each of the disparity vectors 1 comprises a line. The slope of the line indicates the direction of the disparity with reference to the (two-dimensional) image, while the length indicates the magnitude. Since, in the example in FIG. 4, the disparity vectors 1 are not aligned with the horizontal, the vectors 1 are highlighted in black to indicate to the user that the current pose of the camera 3 is not suitable for acquiring the right image that is to be paired with the left image.

Figure 5:
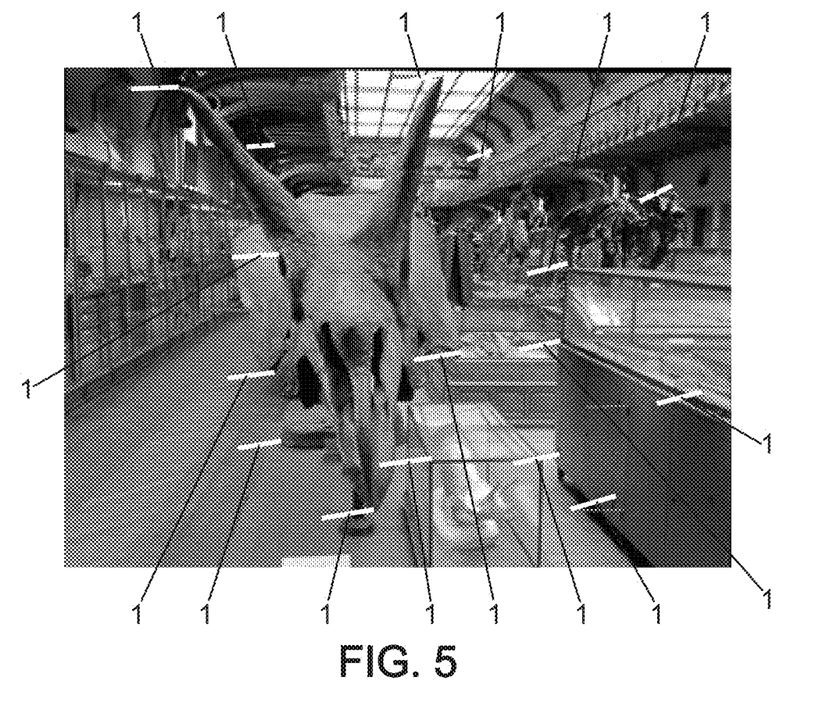
FIG. 5 shows a right image, with horizontal disparity vectors referencing the left image.

FIG. 5 illustrates a similar situation to that described in relation to FIG. 4. However, as can be seen in FIG. 5, in this situation, the camera pose is such that the disparity vectors 1 are aligned with the horizontal, and so the current pose of the camera 3 is suitable for taking the right image to be paired with the left image. Accordingly, the disparity vectors 1 are highlighted in white to indicate to the user that an image can be acquired with the camera 3 in this pose.

If some of the disparity vectors 1 are correctly aligned, but others are not, then the correctly aligned disparity vectors will be highlighted in white, while the incorrectly aligned vectors will be highlighted in black. In such situation the current pose of the camera 3 is unsuitable for acquiring the right image.

The skilled person will recognize that the particular colors or method of highlighting are not important for the function of the embodiment. Accordingly, in alternative embodiments, the color red is used to indicate an unsuitable disparity vector 1, while the color green is used to highlight a suitable disparity vector 1. In further alternative embodiments, the presence of a suitable disparity vector 1 is signaled by displaying other indications, such as changing the color of the entire displayed image or by emitting a sound or by tactile feedback to the user.

In further alternative embodiments, the camera 3 is configured to automatically obtain the second image when it determines that a suitable disparity vector 1 is currently obtained.

As illustrated in FIGS. 4 and 5, several disparity vectors 1 are calculated and displayed on the live right image. In alternative embodiments, fewer disparity vectors 1 are displayed.

In the presently described embodiment, to track a set of points from the left image into the right image, feature extraction and matching algorithms are used. Examples of suitable algorithms are known in the art, such as the SIFT (scale-invariant feature transform) algorithm or the SURF algorithm (Speeded Up Robust Features), and examples of these algorithms can be found in:

Lowe, D. G., "Distinctive Image Features from Scale-Invariant Keypoints", International Journal of Computer Vision, 60, 2, pp. 91-110, 2004; and Herbert Bay, Andreas Ess, Tinne Tuytelaars, Luc Van Gool "SURF: Speeded Up Robust Features", Computer Vision and Image Understanding (CVIU), Vol. 110, No. 3, pp. 346-359, 2008.

The skilled person will recognize how to apply such algorithms to the current situation, and so, a fuller description of the algorithms will not be repeated here.

Figure 6:
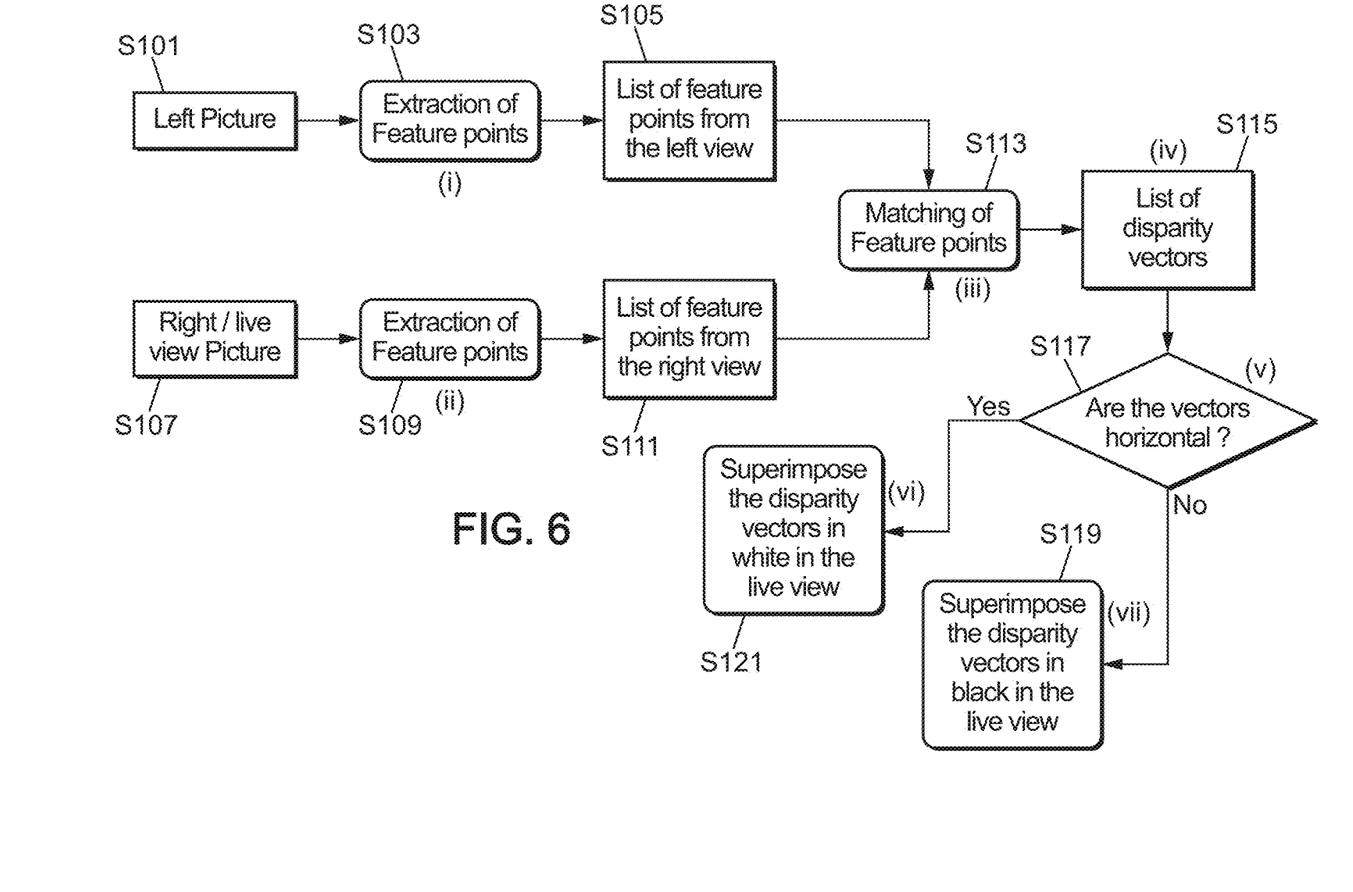
FIG. 6 is a block diagram showing steps of a first embodiment.

FIG. 6 illustrates a flow chart of the steps of the method of the first embodiment. In step S101, a first image, in this example the left image, is acquired, subsequently in step S103, one or more feature points is extracted using a suitable algorithm as described above. In step S105, a list of the extracted feature points is generated.

The right image is acquired in step S107 and, in the same manner as for the left image, feature points are extracted in step S109 and a list generated in step S111. Subsequently, the list of feature points from the left image is compared with that obtained from the right image to determine any matching feature points. If no matches are found, then no disparity vectors 1 can be calculated, and so a further right image must be acquired.

If matching feature points are found, then the disparity vectors 1 between the location of the each point in the left image and the location of its matching point in the right image are determined and listed in step S115. Subsequently, the angle of each disparity vector 1 to the horizontal is determined in step S117.

The skilled person will understand how to make a determination of the angle of a disparity vector 1 relative to a given direction, and so a fuller explanation will not be provided here. As noted earlier, the horizontal direction is defined with respect to the image sensor, and so the angle of each disparity vector is defined with respect to the image sensor.

In step S117, it is determined whether the angles of disparity vectors 1 obtained in step S115 are horizontal. Since it is unlikely that the disparity vectors 1 will be exactly horizontal, some degree of tolerance is used in this determination.

The skilled person will recognize that the correct pose for the camera 3 for acquiring the right image is achieved when each of the disparity vectors 1 is aligned with the horizontal. If some of the disparity vectors are aligned with the horizontal while others are not, then this indicates that some degree of rotation has occurred to the camera pose between the first and current poses. Thus, for practical applications, a minimum number of disparity vectors 1 used is two.

If it is determined that some disparity vectors 1 are aligned in different directions to others, then a statistical treatment of the disparity vector alignments can be used to, for example, determine an average vector alignments for regions of the scene and determine whether this is within a given tolerance of the horizontal direction. The skilled person will recognize various techniques that can be used here, such as ignoring outlying points and averaging the directions of a plurality of disparity vectors 1, to make the determination of whether all of the disparity vectors 1 are deemed to be aligned with the horizontal, and so a fuller explanation will not be given here.

If it is determined that a disparity vector 1 is aligned with the horizontal, then in step S119, it is displayed in the live right image in a manner that indicates to the user that the disparity vector 1 is horizontal. In the example used here the selected manner is that the disparity vectors 1 are displayed in white.

However, if it is determined that a disparity vector 1 is not aligned with the horizontal, then in step S121, it is displayed in the live right image in a manner that indicates to the user that the disparity vector 1 is not horizontal. In the example used here the selected manner is that the disparity vectors 1 are displayed in black.

The right image is acquired as a live image. In other words, right images are repeatedly acquired, and repeated determinations of whether the disparity vectors 1 between each right image and the static left image are made. Thus, steps S107, S109, S111, S113, S115, S117, S119 and S121 can be repeated for each right image. In the present embodiment, this repetition is carried out at the frame rate of the camera 3, commencing from the first frame after the left image is acquired, and ceasing once a suitable right image has been acquired by the user. The image acquisition and storage is achieved, for example, by pressing the shutter button 13 of the camera 3 in response to an indication that the disparity vectors 1 are aligned with the horizontal.

In an alternative embodiment, the shutter to acquire and store the right image is automatically triggered once a determination is made in step S117 that the disparity vectors 1 are all aligned with the horizontal.

In the embodiment described in relation to FIGS. 4 and 5, the determination of whether the current pose of the camera is suitable for obtaining a second (right) image in a stereographic pair is made solely on the basis of whether the disparity vectors 1 are aligned with the horizontal.

However, for a complete determination of the suitability of the current pose, there is a further necessary criterion, namely that the disparity vectors 1 are of a suitable length. The criterion that the disparity vectors 1 are of a suitable length ensures that the horizontal displacement of the camera pose from that used for the first (left) image is of a suitable size.

Thus, in a further alternative embodiment, the length of the disparity vectors 1 is also taken into account. The skilled person will recognize that the length of the disparity vectors 1 can be used as a measure of the separation between the positions of the camera 3 when the left and right images were acquired. As noted above, a suitable distance for this separation is around 6 cm to provide a suitable 3D image "depth". However, since the length of the disparity vectors 1 may not be known in absolute terms, the desired length can be set to be some fraction of the picture width or height. This fraction can, for example, be set to 10% of the picture width. As with the determination of whether the disparity vectors 1 are horizontal, some degree of tolerance can be used in the determination of whether the disparity vectors 1 are of a desired length.

In this embodiment, an indication of whether the disparity vectors 1 are of a desired length can be shown on the viewfinder 11 of the camera 3 together with the disparity vectors 1. For example, text or symbols indicating that the length is too short, too long or acceptable can be displayed on the screen.

In a second embodiment, the user is provided with explicit instructions as to how to change the pose (location and orientation) of the camera 3 such that a suitable right image can be acquired. To achieve this, the method derives the (3D) pose of the camera 3 when acquiring each right image relative to the pose when the left image was acquired. The technique of deriving such relative poses is known in the art as "bundle adjustment". Examples of the technique of "bundle adjustment" technique are described in more detail in the following references: B. Triggs; P. McLauchlan and R. Hartley and A. Fitzgibbon. "Bundle Adjustment—A Modern Synthesis". ICCV '99: Proceedings of the International Workshop on Vision Algorithms. Springer-Verlag. pp. 298-372 and, Bundle adjustment from wikipedia.org.

Accordingly, a full description will not be repeated here. However in brief, and as noted in the referenced Wikipedia page on bundle adjustment, bundle adjustment can be applied to a set of images which depict a number of 3D points from different viewpoints. Using the technique, the problem of simultaneously determining the 3D coordinates describing the scene geometry as well as the parameters of the relative motion and the optical characteristics of the camera 3 employed to acquire the images can be solved. This is achieved using an optimality criterion involving the corresponding image projections of all points.

In the second embodiment, the optical parameters of the camera 3 are assumed to be known, since these parameters can be determined prior to acquiring the images, for example during manufacture. Thus, from a set of 2D coordinates of matched feature points in the left and right (live) images, a bundle adjustment algorithm can be used to estimate the relative motion of the camera 3 between the left and right images. In other words, an estimate of the 3D displacement and orientation of the camera 3 can be estimated.

By determining the estimated 3D displacement in terms of translation and 3D rotation, it is possible to derive parameters which can be used by a user to translate and rotate the camera 3 to obtain an optimal pose for obtaining a right image for combination with the left image to generate a stereoscopic picture.

Figure 7:
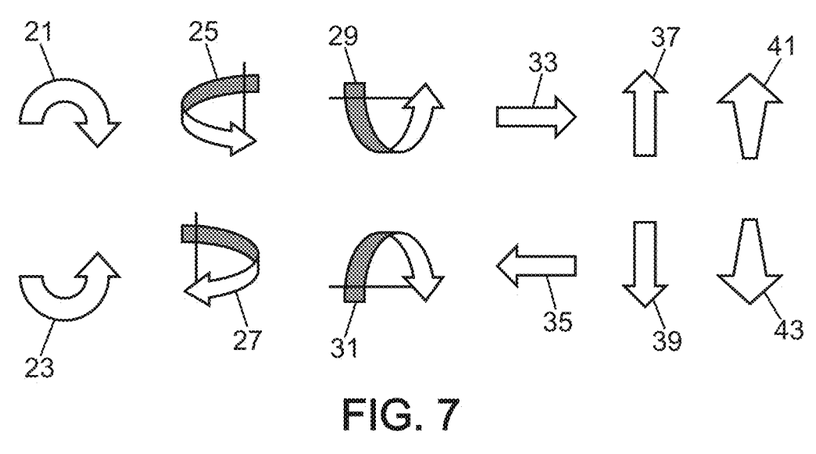
FIG. 7 shows a list of pictograms that can be used to indicate to the user which camera rotation or translation is needed to obtain an optimal right image.

In the present embodiment the parameters are illustrated on the viewfinder 11 of the camera 3 in the form of pictograms indicating how the user should alter the current pose of the camera 3 to arrive at the optimum pose. These pictograms are illustrated in FIG. 7. As can be seen from FIG. 7, the pictograms comprise a complete set of three dimensional translation and rotation adjustments that the user can apply. The three rotation axes are commonly termed roll, pitch and yaw. In FIG. 7 clockwise roll is indicated by a clockwise two-dimensional arrow 21, while anticlockwise roll is indicated by a similar arrow 23, indicating an anticlockwise direction. Pitch and yaw are indicated by three dimensional arrows 25, 27, 29, 31 that are depicted rotating about their respective axes. Left, right, up and down translations are depicted using two-dimensional arrows 33, 35, 37, 39, and forward and backward are depicted using arrows 41, 43 that depict perspective to indicate movement away from or toward the viewer respectively.

Figure 8A:
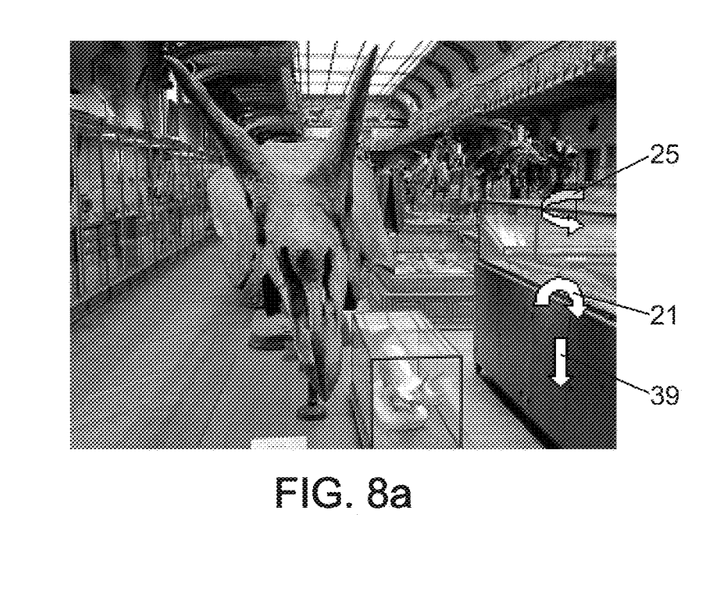
FIG. 8a shows an example of live a view, augmented by 3D positioning icons according to a second embodiment.

FIG. 8a illustrates an example of these pictograms displayed on a live image from the camera 3. The pictograms displayed are an anticlockwise (viewed from above) yaw arrow 25, a clockwise (viewed from behind) roll arrow 21 and a downward translation arrow 39. Thus, in the example shown in FIG. 8, to achieve the optimum location for obtaining the right image, the user is being instructed to rotate the camera 3 about the yaw and roll axes in the directions indicated and move the camera 3 downwards.

Figure 8B:
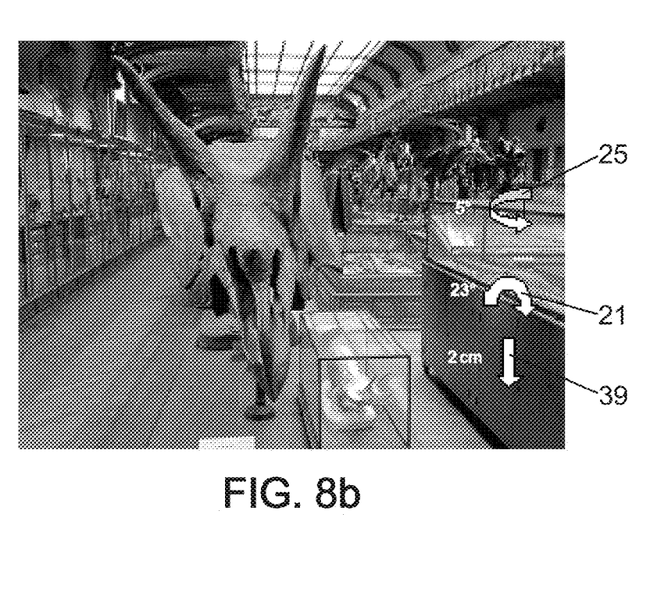
FIG. 8b shows an example of a live view, augmented by 3D positioning icons and indications in degrees and centimeters according to a second embodiment.

FIG. 8b indicates an alternative embodiment, in which the required degree of rotation and size of translation are indicated adjacent to the arrows. Thus, as illustrated in FIG. 8b, the user should rotate the camera 3 about the yaw and roll axes in the directions indicated by 5° and 23° respectively and move the camera 3 downwards by 2 cm.

In the embodiments described in relation to FIGS. 8a and 8b, the achievement of the desired pose is indicated by the lack of display of any of the pictogram arrows. When no arrows are displayed, the user is effectively informed that no further change to the camera pose is required and the second image can be acquired. In alternative embodiments, a message can alternative or additionally be displayed, informing the user that the camera 3 is in the correct pose. For example, the message "OK" can be displayed on the viewfinder 11. Alternatively, or additionally, other methods of indicating that the correct pose is achieved, such as changing the color of the entire displayed image, emission of a sound or by tactile feedback can be used, or automatically triggering the picture acquisition.

Figure 9:
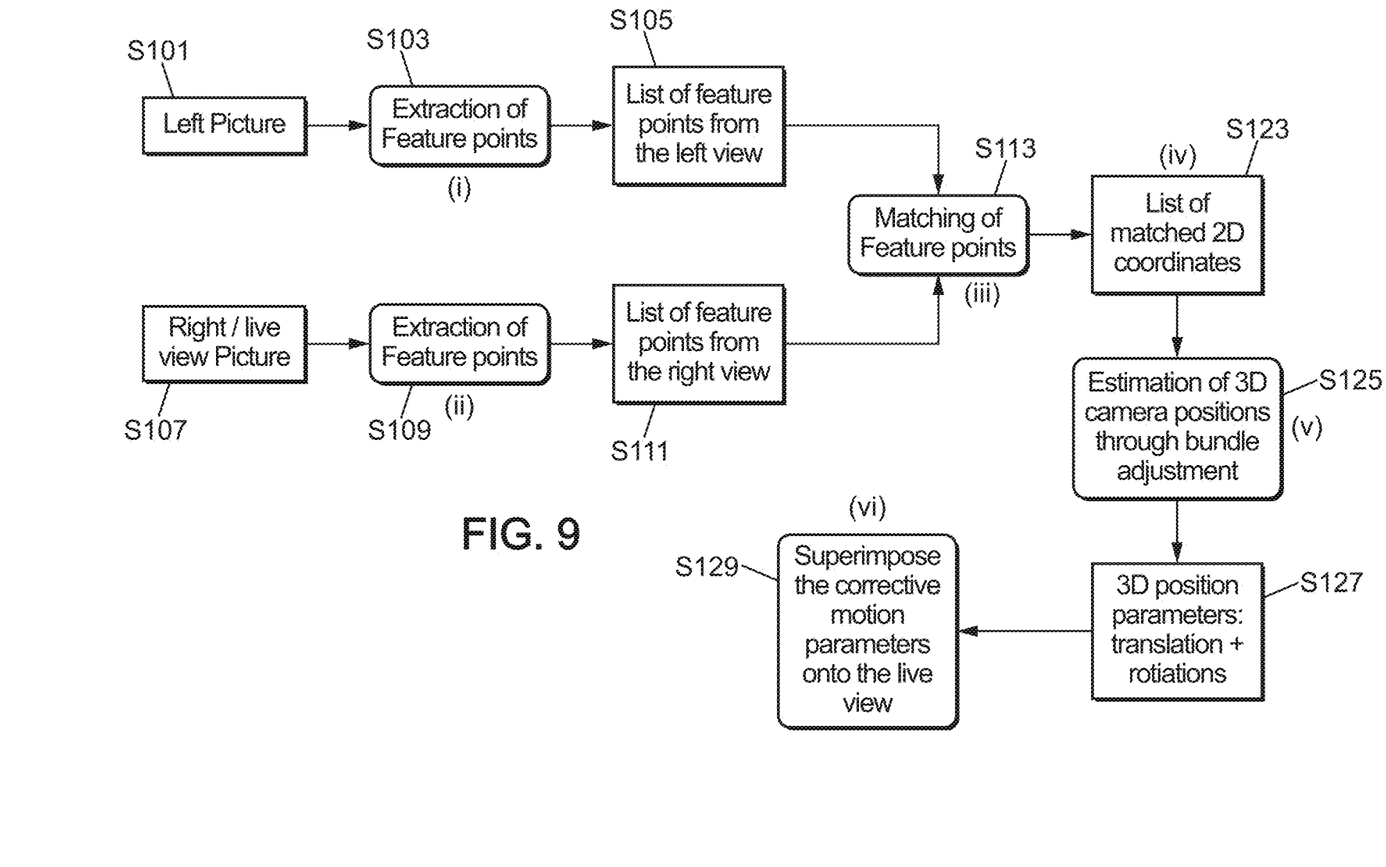
FIG. 9 is a block diagram showing steps of a second embodiment.

FIG. 9 illustrates a flow chart of the steps of the method of the second embodiment. Steps S101, S103, S105, S107, S109, S111 and S113 are the same as described for the first embodiment. Accordingly, the description of these steps will not be repeated.

Thus in the second embodiment, after the step of matching feature points S113, in step S123 a list of matched 2D coordinates is generated. This list comprises the 2D coordinates of each matched feature, both in the left image and the live right image. Subsequently, in step S125 a bundle adjustment algorithm is applied to the list from step S123 to yield an estimate of the change to the camera pose (position and orientation) that occurred between acquiring the left and right images.

Using the estimate derived in S125, in step S127 corrective translation and rotation parameters are determined such that, when these parameters are applied to the camera 3 an optimal pose is achieved for acquiring a right image to be paired with the left image to form a stereoscopic image. In this second embodiment, it is assumed that the optimal placement corresponds to a purely horizontal translation of approximately 6 cm, and zero roll/yaw/pitch angles, so that for the left and right images, the camera 3 points in the same direction.

Once the corrective parameters have been derived in S127, the relevant pictograms as described in relation to FIG. 7 are displayed on the screen of the camera 3 in step S129, and as illustrated in FIG. 8a or 8b.

As in the first embodiment it is unlikely that all of the requirements for obtaining the optimal position for obtaining the right image are attained at the same time. Therefore, some degree of tolerance is used in the determination of whether the optimal pose has been achieved. The level of tolerance can be the same for each of the possible translations and rotations, for example the same translation error can be permitted in each translation direction, and the same rotation error permitted in each rotation axis. Alternatively, different levels of tolerance can be applied to different translation or rotation directions.

Again, as with the first embodiment, the right image is acquired as a live image. In other words, right images are repeatedly acquired, and repeated determinations of the corrective parameters are made between each right image and the static left image. Thus, steps S107, S109, S111, S113, S123, S125, S127 and S129 can be repeated for each right image. In the present embodiment, this repetition is carried out at the frame rate of the camera 3, commencing from immediately after the left image is acquired and ceasing once a suitable right image has been acquired by the user, for example by pressing the shutter button 13 of the camera 3 in response to an indication that the optimum pose is achieved.

In an alternative embodiment, the shutter to acquire and store the right image is automatically triggered once a determination is made in step S127 that the corrective parameters derived in S127 are each below a given tolerance.

In a further alternative embodiment, the bundle adjustment can be made on the basis of more than two images to help improve the accuracy of the determined corrective parameters.

In a third embodiment, rather than deriving information related to the relative motion of the camera 3 via an analysis of features in images from the camera 3, the relative motion is instead estimated using accelerometers and gyroscopes to track the 3D camera pose.

Figure 10:
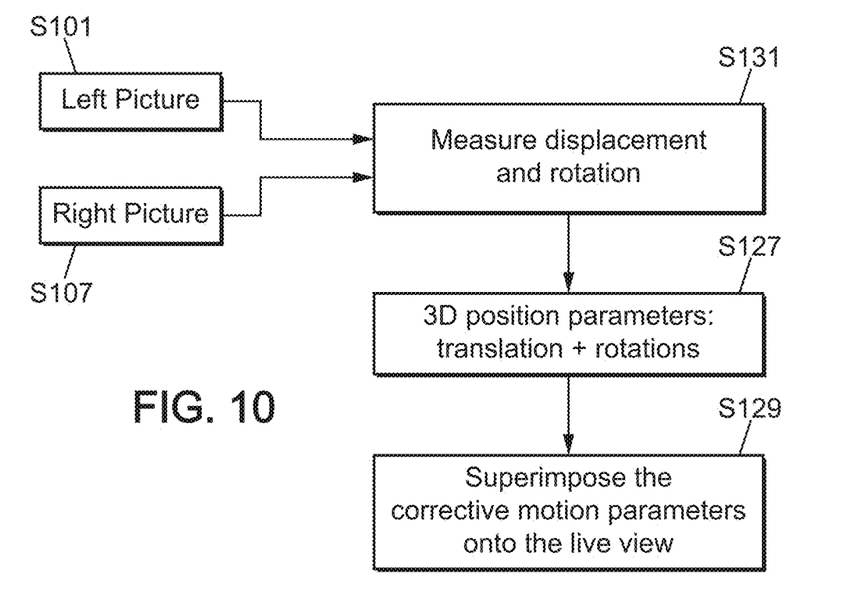
FIG. 10 is a block diagram showing steps of a third embodiment.

FIG. 10 illustrates a flow chart of the steps of the method of the third embodiment. As with the first and second embodiments, the left (static) and right (live) images are acquired in steps S101 and S107 respectively. Subsequently, in step S131, the displacement and rotation of the camera 3 between acquiring the left image and the right image is measured using data from accelerometers and gyroscopes integral with the camera 3. From the measured displacement and rotation, in step S127 the corrective translation and rotation parameters are determined as described in relation to the second embodiment.

In the same manner as for the second embodiment, the relevant pictograms as described in relation to FIG. 7 are then displayed on the viewfinder 11 of the camera 3 in step S129, and as illustrated in FIG. 8a or 8b.

In an alternative embodiment, the second and the third embodiments can be combined. Thus, in this embodiment, the estimation of the displacement and rotation of the camera 3 between acquiring the left image and the right image is made using both data from accelerometers and gyroscopes integral with the camera 3 and also by the bundle adjustment process described in relation to the second embodiment. Thus, in this embodiment, by using estimates from both methods, an improved estimate for the displacement and rotation of the camera 3 can be achieved.

The present disclosure can also be embedded in a computer program product, which comprises all the features enabling the implementation of the methods described herein, and which—when loaded in an information processing system—is able to carry out these methods. Computer program means or computer program in the present context mean any expression, in any language, code or notation, of a set of instructions intended to cause a system having an information processing capability to perform a particular function either directly or after conversion to another language. Such a computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

While there has been illustrated and described what are presently considered to be the preferred embodiments of the present disclosure, it will be understood by those skilled in the art that various other modifications may be made, and equivalents may be substituted, without departing from the true scope of the present disclosure. Additionally, many modifications may be made to adapt a particular situation to the teachings of the present disclosure without departing from the central inventive concept described herein. Furthermore, an embodiment of the present disclosure may not include all of the features described above. Therefore, it is intended that the present disclosure not be limited to the particular embodiments disclosed, but rather include all embodiments falling within the scope of the present disclosure as broadly defined above.

A person skilled in the art will readily appreciate that various parameters disclosed in the description may be modified and that various embodiments disclosed and/or claimed may be combined without departing from the scope of the present disclosure.

What is claimed is:

1. A method of determining a suitable pose for a camera for obtaining a stereoscopic image pair, the camera comprising an imaging sensor, the method comprising:
    obtaining and storing a first image of a scene using the imaging sensor when the camera is in a first pose;
    performing at least two iterations of obtaining a second image of the scene using the same imaging sensor when the camera is in a different, second pose;
    determining, for each iteration of obtaining the second image, one or more disparity vectors, each disparity vector being determined between a feature identified within the first image and a corresponding feature identified in the second image, wherein the disparity vector indicates the difference in location of the feature identified within the first image and the corresponding feature identified in the second image; and
    displaying to a user one or more disparity vectors overlaid on one of the first and second images displayed to the user;
    determining whether the second pose matches an optimal second pose based on the one or more disparity vectors, and a predetermined positional tolerance, wherein the second pose is optimal for recording a second image to be presented, together with the first image, as a stereoscopic image pair; and
    if the second pose does not match the optimal second pose:
        determining one or more positional adjustments to be made to the second pose to match the optimal second pose; and
        displaying pictograms on an electronic display of the camera to represent the one or more desired positional adjustments; and
    determining, on the basis of the one or more disparity vectors, whether the second image of the scene is suitable for use, together with the first image, as a stereoscopic image pair.

2. The method of claim 1, further comprising storing the second image automatically when it is determined that the second pose is suitable.

3. The method of claim 1, further comprising making repeated determinations of whether the second pose is suitable as the camera is moved by a user.

4. The method of claim 1, wherein the indicating information comprises an indication of the direction of the one or more disparity vectors displayed on a display of the camera.

5. The method of claim 4, wherein the display of the one or more disparity vectors is altered when it is determined that the one or more disparity vectors is parallel with the horizontal direction.

6. The method of claim 1, wherein the indicating information further comprises an indication of the length of the one or more disparity vectors.

7. The method of claim 1, wherein a plurality of disparity vectors are determined, and the indicating information further comprises an indication of the relative angle between each of the plurality of disparity vectors.

8. A camera for obtaining a stereoscopic image pair, the camera comprising:
an imaging sensor; and
one or more processing circuits configured to:
obtain and storing a first image of a scene using the imaging sensor when the camera is in a first pose;
perform at least two iterations of obtaining a second image of the scene using the same imaging sensor when the camera is in a different, second pose;
determine, for each iteration of obtaining the second image, one or more disparity vectors, each disparity vector being determined between a feature identified within the first image and a corresponding feature identified in the second image, wherein the disparity vector indicates the difference in location of the feature identified within the first image and the corresponding feature identified in the second image; and
display to a user one or more disparity vectors overlaid on one of the first and second images displayed to the user;
determine whether the second pose matches an optimal second pose based on the one or more disparity vectors, and a predetermined positional tolerance, wherein the second pose is optimal for recording a second image to be presented, together with the first image, as a stereoscopic image pair; and
if the second pose does not match the optimal second pose:
determining one or more positional adjustments to be made to the second pose to match the optimal second pose; and
displaying pictograms on an electronic display of the camera to represent the one or more desired positional adjustments; and
determine, on the basis of the one or more disparity vectors whether the second image of the scene is suitable for use, together with the first image, as a stereoscopic image pair.

9. A computer program product stored in a non-transitory computer-readable medium for determining a suitable pose for a camera for obtaining a stereoscopic image pair, the computer program product comprising software instructions which, when run by a processor of the camera, configures the camera to:
obtain and storing a first image of a scene using the imaging sensor when the camera is in a first pose;
perform at least two iterations of obtaining a second image of the scene using the same imaging sensor when the camera is in a different, second pose;
determine, for each iteration of obtaining the second image, one or more disparity vectors, each disparity vector being determined between a feature identified within the first image and a corresponding feature identified in the second image, wherein the disparity vector indicates the difference in location of the feature identified within the first image and the corresponding feature identified in the second image; and
display to a user one or more disparity vectors overlaid on one of the first and second images displayed to the user;
determine whether the second pose matches an optimal second pose based on the one or more disparity vectors, and a predetermined positional tolerance, wherein the second pose is optimal for recording a second image to be presented, together with the first image, as a stereoscopic image pair; and
if the second pose does not match the optimal second pose:
determining one or more positional adjustments to be made to the second pose to match the optimal second pose; and
displaying pictograms on an electronic display of the camera to represent the one or more desired positional adjustments; and
determine, on the basis of the one or more disparity vectors whether the second image of the scene is suitable for use, together with the first image, as a stereoscopic image pair.

10. A method of determining a suitable pose for a camera for obtaining a stereoscopic image pair, the camera comprising an imaging sensor, the method comprising:
obtaining and storing a first image of a scene using the imaging sensor when the camera is in a first pose;
performing at least two iterations of obtaining a second image of the scene using the imaging sensor when the camera is in a different, second pose;
determining one or more disparity vectors, each disparity vector being determined between a feature identified within the first image and a corresponding feature identified in the second image, wherein the disparity vector indicates the difference in location of the feature identified within the first image and the corresponding feature identified in the second image;
displaying to a user one or more disparity vectors overlaid on one of the first and second images displayed to the user; and
determining whether the second pose matches an optimal second pose based on the one or more disparity vectors, and a predetermined positional tolerance, wherein the second pose is optimal for recording a second image to be presented, together with the first image, as a stereoscopic image pair; and
if the second pose does not match the optimal second pose:
determining one or more positional adjustments to be made to the second pose to match the optimal second pose; and
displaying pictograms on an electronic display of the camera to represent the one or more desired positional adjustments.

11. The method of claim 10, wherein said determining whether the second pose matches the optimal second pose is performed based on a comparison of the first and second images, and includes performance of a bundle adjustment algorithm.

12. The method of claim 10, wherein said determining whether the second pose matches the optimal second pose is performed using data from an accelerometer of the camera, a gyroscope of the camera, or both.

13. The method of claim 10, wherein the second pose is determined to match the optimal second pose comprises if the second pose matches the optimal second pose within one or more positional tolerances.

14. The method of claim 10, wherein said displaying pictograms comprises displaying the second image, or a live image feed from the camera in the second pose, on the electronic display of the camera while the pictograms are being displayed.

15. The method of claim 10, wherein said displaying pictograms comprises:
displaying, for each pictogram, a number indicating a desired magnitude of the positional adjustment represented by the pictogram.

16. The method of claim 10, further comprising automatically recording an additional second image when it is determined that a position of the camera matches the optimal second pose.

17. A camera for obtaining a stereoscopic image, the camera comprising:
an imaging sensor;
an electronic display; and
one or more processing circuits configured to:
obtain and storing a first image of a scene using the imaging sensor when the camera is in a first pose;
perform at least two iterations of obtain a second image of the scene using the imaging sensor when the camera is in a different, second pose;
determine one or more disparity vectors, each disparity vector being determined between a feature identified within the first image and a corresponding feature identified in the second image, wherein the disparity vector indicates the difference in location of the feature identified within the first image and the corresponding feature identified in the second image;
display to a user one or more disparity vectors overlaid on one of the first and second images displayed to the user; and
determine whether the second pose matches an optimal second pose based on the one or more disparity vectors, and a predetermined positional tolerance, wherein the second pose is optimal for recording a second image to be presented, together with the first image, as a stereoscopic image pair; and
if the second pose does not match the optimal second pose:
determine one or more positional adjustments to be made to the second pose to match the optimal second pose; and
display pictograms on the electronic display of the camera to represent the one or more desired positional adjustments.

18. The camera of claim 17, wherein the determination of whether the second pose matches the optimal second pose is performed based on a comparison of the first and second images, and includes performance of a bundle adjustment algorithm.

19. The camera of claim 17, wherein the determination of whether the second pose matches the optimal second pose is performed using data from an accelerometer of the camera, a gyroscope of the camera, or both.

20. A computer program product stored in a non-transitory computer-readable medium for determining a suitable pose for a camera for obtaining a stereoscopic image pair, the computer program product comprising software instructions which, when run by a processor of the camera, configures the camera to:
obtain and store a first image of a scene using the imaging sensor when the camera is in a first pose;
perform at least two iterations of obtaining a second image of the scene using the same imaging sensor when the camera is in a different, second pose;
determine one or more disparity vectors, each disparity vector being determined between a feature identified within the first image and a corresponding feature identified in the second image, wherein the disparity vector indicates the difference in location of the feature identified within the first image and the corresponding feature identified in the second image;
display to a user one or more disparity vectors overlaid on one of the first and second images displayed to the user; and
determine whether the second pose matches an optimal second pose based on the one or more disparity vectors, and a predetermined positional tolerance, wherein the second pose is optimal for recording a second image to be presented, together with the first image, as a stereoscopic image pair; and
if the second pose does not match the optimal second pose:
determine one or more positional adjustments to be made to the second pose to match the optimal second pose; and
display pictograms on an electronic display of the camera to represent the one or more desired positional adjustments.

21. The computer program product of claim 20, wherein the determination of whether the second pose matches the optimal second pose is performed based on a comparison of the first and second images, and includes performance of a bundle adjustment algorithm.

22. The computer program product of claim 20, wherein the determination of whether the second pose matches the optimal second pose is performed using data from an accelerometer of the camera, a gyroscope of the camera, or both.

23. The computer program product of claim 20, wherein the second pose is determined to match the optimal second pose if the second pose matches the optimal second pose within one or more positional tolerances.

* * * * *